United States Patent [19]

Yanagida et al.

[11] 4,455,582
[45] Jun. 19, 1984

[54] ERASE FEATURES FOR MAGNETIC MULTI-TRACK RERECORDING

[75] Inventors: Seiichi Yanagida, Hiratsuka; Motohiko Takeuchi; Hideki Marumoto, both of Yokohama, all of Japan

[73] Assignee: Tokyo Shibaura Denki Kabushiki Kaisha, Kawasaki, Japan

[21] Appl. No.: 364,235

[22] Filed: Apr. 1, 1982

[30] Foreign Application Priority Data

Apr. 20, 1981 [JP] Japan ................. 56-58612

[51] Int. Cl.³ .......................... G11B 5/02; G11B 5/55; G11B 5/58; G11B 5/86
[52] U.S. Cl. ........................................ 360/77; 360/13; 360/66; 360/78
[58] Field of Search ............... 360/13, 66, 75, 77, 360/78

[56] References Cited

U.S. PATENT DOCUMENTS 3,011,031 11/1961 Loewe et al. ................... 360/78
4,074,071 2/1978 Shragal ......................... 360/78
4,414,593 11/1983 Miller et al. .................. 360/102

FOREIGN PATENT DOCUMENTS 2133324 1/1973 Fed. Rep. of Germany .
3023738 1/1981 Fed. Rep. of Germany .
55-84009 6/1980 Japan ............................ 360/78

OTHER PUBLICATIONS

M. A. Heinrichs 'Tonband-Service-Handbuch', 1971, p. 33.
E. Christian 'Magnettontechnik' 1969, p. 220.

Primary Examiner—George G. Stellar
Attorney, Agent, or Firm—Oblon, Fisher, Spivak, McClelland & Maier

[57] ABSTRACT

A magnetic recording system which comprises a recording/reproducing head for effecting recording and reproduction of data with respect to one recording track formed on a magnetic tape, an erasing head disposed in side by side relation with respect to the head and secured thereto, for effecting erasing with respect to two tracks, i.e., the track traced by the recording/reproducing head and the next track, an auto-tracking circuit for compensating for the deviation of the position of the recording/reproducing head with respect to the start track for rerecording, and a switch control section for controlling the operation of the erasing head by causing switching of a switch circuit connected to the erasing head.

8 Claims, 9 Drawing Figures

ERASE FEATURES FOR MAGNETIC MULTI-TRACK RERECORDING

BACKGROUND OF THE INVENTION

This invention relates to a magnetic recording system for recording and reproducing data with respect to a specified track section among a plurality of recording tracks formed on a magnetic recording medium in a predetermined direction thereof.

The magnetic recording system is presently one of the most effective systems for recording such data as image data, voice data or digital data which is provided from a computer. Video tape recorders (VTR) for recording and reproducing image signals, for instance, usually adopt a rotary head system. In the rotary head type VTR, however, the mechanism for accurately driving a head section for rotation is complicated and involves a large number of component parts, so that its manufacturing cost is high.

In order to solve this problem, a magnetic recording system based on a so-called stationary head system has been proposed. With the stationary head system, a plurality of parallel recording tracks are formed on a magnetic recording medium, for instance a magnetic tape of an endless tape unit, in a predetermined direction of running of the tape. In the recording/reproducing mode, various heads of the head section are moved in a direction substantially perpendicular to the direction of the recording tracks, i.e., in the direction of the tape width, and brought to a position corresponding to a desired track for recording, reproduction or erasing of data. In the stationary head type magnetic recording system mentioned above, two heads, i.e., a recording-/reproducing head and an erasing head, for instance, are provided.

In the prior art, the recording/reproducing head and erasing head have their respective recording/reproducing width (which corresponds to the core width and referred to in the specification as operating width) and erasing width set to correspond to the width of one recording track. When performing the so-called rerecording (i.e. erasing old data and recording new data), the data that has already been recorded on a magnetic tape is erased and, in place of the erased data, new data is recorded over a specified track section from a given track position. The aforementioned heads are moved to a position which does not precisely correspond to but is more or less deviated from the specified start track. This results from the fluctuations in the precision of the component parts, the precision of assembly of individual units and also errors produced due to vibrations occurring in the direction of the tape width when the tape is run. Therefore, when the recording is made under the aforementioned circumstances, excessive erasure or insufficient erasure of data results. Thus, with the aforementioned deviation from the track, the erasure of one track has adverse effects upon an adjacent track in addition to the possibility of the excessive erasure or insufficient erasure as mentioned above.

SUMMARY OF THE INVENTION

An object of the present invention is to provide a magnetic recording system which operates reliably during the rerecording mode.

It is another object of this invention to provide a magnetic recording system which permits high quality recording of new data in the rerecording mode.

It is yet another object of this invention to provide a magnetic recording system which prevents excessive erasure or insufficient erasure of data in the rerecording mode.

With the magnetic recording system according to the invention, rerecording over a specified track section among a plurality of recording tracks formed on a magnetic recording medium is effected by a first head for recording and reproducing data and a second head for erasing data. The plurality of recording tracks mentioned above are formed on the magnetic recording medium such that they extend in a first direction corresponding to a predetermined running direction of the medium. These tracks have an equal width. The first head mentioned above effects the recording and reproduction of data with respect to a single recording track. Meanwhile, the second head, which is disposed in side by side relation with respect to the first head in the direction of the recording tracks and is secured thereto, simultaneously erases the data on two or more recording tracks among the tracks contained in the track section specified for the rerecording. The two or more recording tracks include at least the recording track traced by the first head and the next adjacent recording track. A head position adjusting device detects a deviation of the position of the first head with respect to the start track of the rerecording and compensates for the deviation of position by moving the aforementioned first and second head in a second direction substantially perpendicular to the aforementioned first direction according to the detected extent of deviation. A controller for controlling the operation of the second head is connected to this head. This controller starts the erasing operation of the second head when the first head is brought to a position corresponding to the start track at the time of the rerecording. After the data stored in the end track of the specified track section for the rerecording has been erased by the second head, the controller stops the erasing operation of the second head.

DETAILED DESCRIPTION OF THE PREFERRED EMBODIMENT

Figure 1:
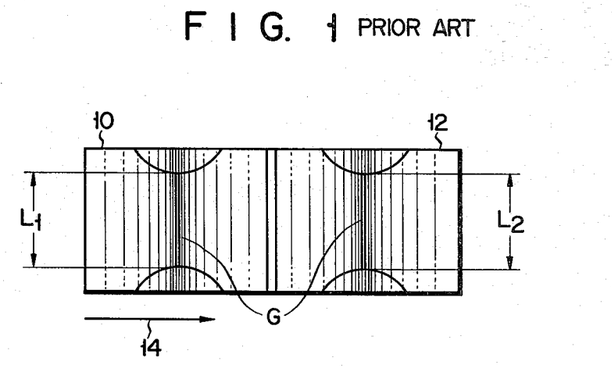
FIG. 1 is an elevational view showing an erasing head and a recording/reproducing head provided in a prior art magnetic recording system.

Prior to describing a preferred embodiment of the invention, the prior art will first be described in connection with one example thereof in order to facilitate the understanding of the invention. FIG. 1 shows an elevational view of a head section provided in a prior art recording system, for instance a VTR, based on the stationary head system. An erasing head 10 and a recording/reproducing head 12 are disposed side by side in the direction 14 of running of a magnetic tape (not shown). These heads 10 and 12 have respective gaps G and are accommodated in and fixed in position in a side-by-side relation to each other in a shield case (not shown). The erasing head 10 has an erasing width $L_1$ which corresponds to the width of one recording track formed on the magnetic tape. The recording/reproducing head 12 has a recording/reproducing width (hereinafter referred to as operating width for the sake of simplicity) $L_2$ which also corresponds to the width of one recording track. In other words, in the prior art the erasing width $L_1$ of the erasing head 10 and the operating width $L_2$ of the recording/reproducing head $L_2$ are set equal to each other, substantially corresponding to the width of one recording track.

Figure 2:
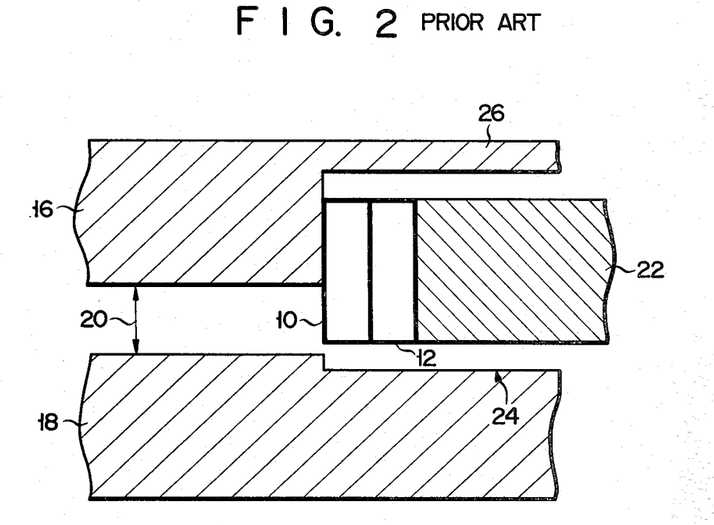
FIG. 2 is a partial view showing a model of the state of recording on a magnetic tape when rerecording is effected with the pair of heads shown in FIG. 1 in a state deviated from the intended recording track.

On the magnetic tape, a number of recording tracks, for instance about 300 tracks for a width of ½ inch, are formed. When the so-called rerecording operation is made with the prior art VTR such as the one described above, the heads 10 and 12 are both prone to deviation with respect to the intended track because of errors due to fluctuations of the tape, in a direction substantially parallel to the tape width, caused by the tape drive mechanism. Particularly, where the rerecording is done with a different VTR, of the same type however than the VTR that is used at the time of the recording, the deviation of the heads 10 and 12 is increased because of errors that are caused due to fluctuations in the precision of finish of parts and the precision of assembling the individual units. FIG. 2 shows a model of the prior art method of recording on a magnetic tape for the case when the rerecording is continued in the situation mentioned above. Reference numeral 16 designates a track, on which the rerecording is to be done. A guard band 20 is provided between the track 16 and a track 18 next to the track 16. A track 22 on which newly recorded data is stored is formed in the tape area that has been traced by the recording/reproducing head 12. It will be seen that if the erasing head 10 and the recording/reproducing head 12 are deviated downwards, a portion 24 of the recording track 18 on which data which need not be erased will be subjected to undesired erasure (i.e., over-erasure) due to a so-called fringe effect of the erasing head 10. Also, a portion 26 of the track 16 on which data to be erased for rerecording of the new data is stored, is left without being correctly erased (insufficient erasure). The excessive erasure and insufficient erasure that are produced in the above way generates greater noise which reduces the signal-to-noise ratio and thus deteriorate the quality of the image reproduction.

Figure 3:
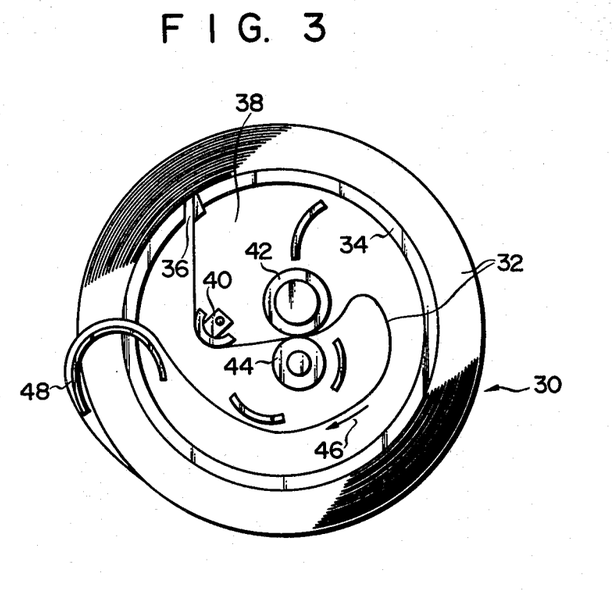
FIG. 3 is a plan view showing a magnetic tape unit incorporated in a magnetic recording system according to the invention.

Now, one embodiment of the present invention applied to a stationary head type magnetic recording system, for instance a VTR, will be described with reference to FIGS. 3 to 7. FIG. 3 shows a magnetic recording medium used with the system, for instance an endless tape unit 30. An endless magnetic tape 32 is wound around the outer periphery of an annular stationary reel 34. The stationary reel 34 is provided with a window 36, through which the innermost turn of the magnetic tape is withdrawn. That is, the innermost winding of the magnetic tape 32 wound on the reel 34 is withdrawn through the window 36 into the inner space 38 defined by the stationary reel 34. In the inner space 38 of the stationary reel 34, a head feed mechanism 40 and a tape drive mechanism including a capstan 42 and a pinch roller 44 are disposed. The recording/reproducing head and erasing head, which will be described later, are accommodated in a well-known shield case (not shown) which is secured to the head feed mechanism 40. The magnetic tape 32 that is led out through the window 36 is driven in a state elastically pinched between the capstan 42 and pinch roller 44 to proceed in the direction of arrow 46 in contact with the aforementioned two heads (to be described later in connection with FIGS. 5 and 6). After emerging from between the capstan 42 and the pinch roller 44, the magnetic tape 32 runs along tape guides (or so-called overturn guides) extending over the stationary reel 34 so as to be led to the outer periphery of the roll of the tape wound on the reel 34. In this way, the magnetic tape 32 is run as an endless tape.

In the aforementioned endless tape unit 30, the head feed mechanism 40 serves to move the recording/reproducing head and erasing head in the width direction of the magnetic tape 32, i.e., in a direction substantially perpendicular to the tape running direction. With this head feed mechanism 40, the two heads can be freely set in a position corresponding to the desired track of the magnetic tape 32 for recording or reproduction of video signal and the like. The recording operation will now be described. Where the first track is set along the proximity of one edge, for instance the lower edge, of the magnetic tape 32, the second and subsequent tracks are formed by moving the heads stepwise by a distance corresponding to one track pitch every time the endless tape 32 completes one cycle.

Figure 4:
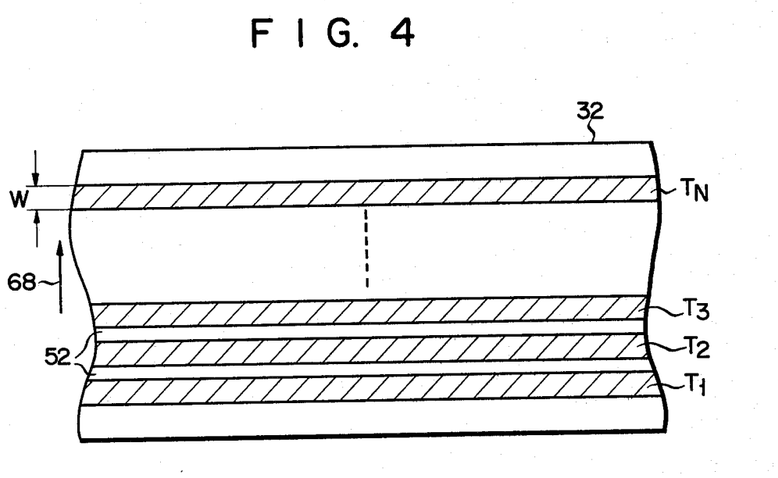
FIG. 4 is a partial view showing a model of the recording track pattern formed on the magnetic tape of the tape unit shown in FIG. 3.

FIG. 4 shows a model of the pattern of recording tracks that is formed in the above way. In the Figure, individual recording tracks $T_1$, $T_2$, $T_3$, . . . , $T_N$ are shown shaded. The first recording track $T_1$ extends in the direction of running of the magnetic tape 32. The second to N-th recording tracks $T_2$, $T_3$, . . . , $T_N$ are formed substantially parallel to the first recording track $T_1$. The areas where no information is recorded (referred to as guard band 52) are each provided between adjacent ones of the recording tracks $T_1$, $T_2$, $T_3$, . . . , $T_N$.

Figure 5:
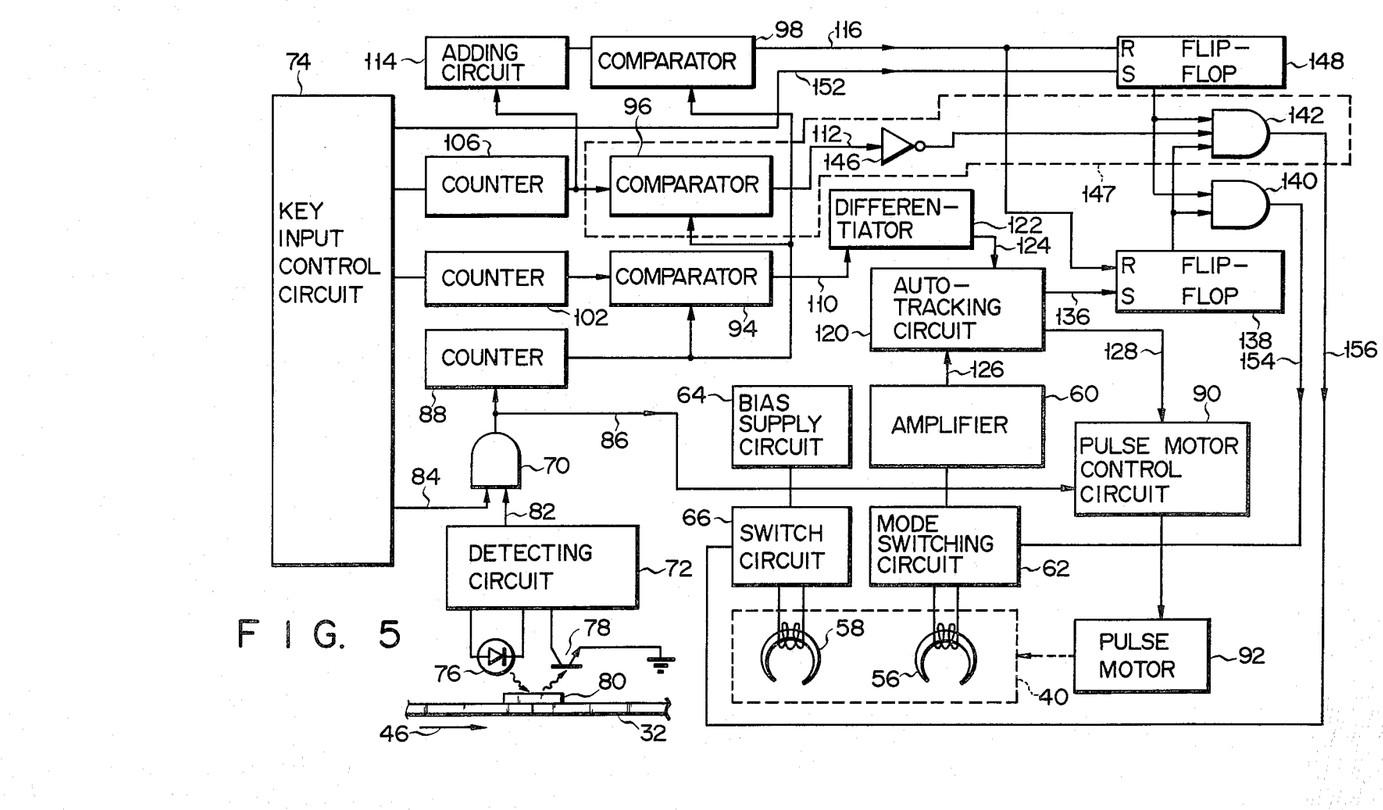
FIG. 5 is a block diagram showing the circuit construction of one embodiment of the magnetic recording system according to the invention.
Figure 6:
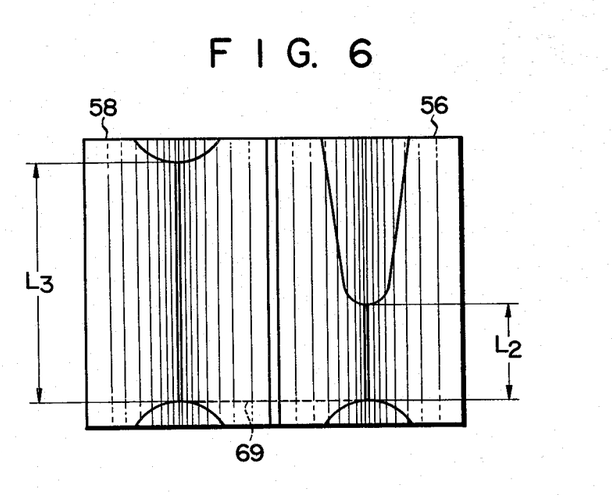
FIG. 6 is an elevational view showing an erasing head and a recording/reproducing head provided in the magnetic recording system shown in FIG. 5.

The stationary head type construction of the video tape recorder as one embodiment of the invention will now be described with reference to FIGS. 5 and 6. In FIG. 5, the recording/reproducing head and erasing head that are mounted in the head feed mechanism 40 are respectively designated at 56 and 58. The recording/reproducing head 56 is connected to a reproducing amplifier 60 through a well-known switching circuit 62. The erasing head 58 is connected to a well-known bias current supply circuit 64 through a switch circuit 66 having well-known arrangement. FIG. 6 shows the elevational view of these two heads 56 and 58. The operating width of the recording/reproducing head 56, is set equal to the operating width $L_2$ of the prior art recording/reproducing head 12, that is, it corresponds to one track width W (FIG. 4). The erasing head 58 has an erasing width $L_3$, which is greater than the operating width $L_2$ of the head 56. The erasing width $L_3$ of the erasing head 58 is set to cover at least two or more of the plurality of recording tracks $T_1, T_2, T_3, \ldots, T_N$ shown in FIG. 4. For example, in the present embodiment, the erasing width $L_3$ of the erasing head 58 is set to $$L_4 \approx 2W + a$$

where W is the width of the individual recording tracks $T_1, T_2, T_3, \ldots, T_N$ and a is the width of one guard band 52 between adjacent tracks so that it can simultaneously cover two tracks as the head is in slidable contact with the tape for continuous erasing operation.

In this embodiment, the tracks are numbered 1, 2, 3, ..., N upwardly from the lower edge of the tape. When the rerecording is made over a plurality of tracks, the recording/reproducing head 56 and erasing head 58 are moved upwards, i.e., in the direction of arrow 60, with respect to the magnetic tape 32. From the above considerations, the head widths $L_2$ and $L_3$ of the two heads 56 and 58 which are in side-by-side arrangement and secured to each other, are correctly aligned with respect to the lower edge of the heads as shown by a broken line 69 in FIG. 6. In other words, the head end portions of the head widths $L_2$ and $L_3$ as viewed from their moving direction are correctly aligned with each other. Thus, in the converse case to the illustrated embodiment, in which the individual recording tracks T are numbered downwards from the upper edge of the magnetic tape 32, the upper edges of the head widths $L_2$ and $L_3$ of the aforementioned heads 56 and 58 are aligned with each other. This is done so for the purpose of preventing the excessive erasure of a track having a track number immediately succeeding that of the track with which to start the rerecording.

Referring again to FIG. 5, a gate circuit 70, which is a two-input AND network, has its input ends which are respectively connected to a tape mark detecting circuit 72 and a key input control circuit 74. The tape mark detecting circuit 72 has a well-known construction including a light-emitting element, for instance a light-emitting diode (LED) 76, and a light-receiving element, for instance a phototransistor 78. As a tape mark 80, which may be a metal thin film applied to the magnetic tape 32, passes by these elements, light emitted from the LED 76 is reflected by the tape mark 80 to be incident on the photo-transistor 78. As a result, the detecting circuit 72 supplies a detection signal 82 in the form of a pulse signal to the gate circuit 70. The gate circuit 70 serves to receive the tape mark signal 82 which is provided for every cycle of the magnetic tape 32 and a gate signal 84 of logic "1" provided from the key input control circuit 74 and supplies a pulse signal 86 to a track counter 88 and a well-known pulse motor control circuit 90 every time the endless magnetic tape 32 completes one cycle.

The pulse motor control circuit 90 is coupled to a head drive section, for instance a pulse motor 92, and controls the driving of the pulse motor 92 in response to the pulse signal 86, thus causing the movement of the two heads 56 and 58 in the direction of arrow 68 (FIG. 4) by an amount corresponding to one track pitch. The track counter 88 counts up the track number of tracks T over which the heads 56 and 58 are moved. The counter 88 is reset when the heads 56 and 58 are brought to a position corresponding to the lower edge of the tape, i.e., corresponding to the first track $T_1$, and adds 1 to its count in response to the pulse signal 86 mentioned above every time the magnetic tape 32 completes one cycle. Thus, the value of the counter 88 corresponds to data corresponding to the number of the track, to which the heads 56 and 58 currently correspond. This data is supplied to one input end of each of first to third comparators 94, 96 and 98, connected to the output end of the counter 88.

The other input of the first comparator 94, is connected through a start track counter 102 to the key input control circuit 74. The other input of the second comparator 96 is connected through an end track counter 106 to the key input control circuit 74. The key input control circuit 74 serves to receive key signals from a track No. key, a start track select key, an end track select key and a mode key, these keys not being visible in the figure, and generate the aforementioned gate signal 84. It also serves to specify the start track No. and end track No. to the respective first and second comparators 94 and 96. When the rerecording is effected over a width range or a track section corresponding to a plurality of tracks designated, the first comparator 94 thus compares the track No. of the track to which the heads 56 and 58 currently correspond (i.e., current track No.) and the start track No. provided from the start track No. counter 102, as specified by the key input control circuit 74. The second comparator 96 compares the current track No. and end track No. provided from the end track No. counter 106. These comparators 94 and 96 provide respective coincidence signals 110 and 112 when the compared data mentioned above coincide. The output of the counter 106 is also connected through an adding circuit 114 to the third comparator 98. The adding circuit 114 serves to add 1 to the track No. corresponding to the end track, as provided from the end track No. counter 106. More particularly, the adding circuit 114 serves to form the next track No. to the preset end track No. The sum output data of the adding circuit 114 is supplied to the third comparator 98. The third comparator 98 compares the outputs of the adding circuit 114 and track counter 88 and, when these outputs coincide, generates a coincidence signal 116.

The output of the first comparator 94 is connected through a differentiator 122 of a well-known construction to a head position adjusting circuit, known as an auto-tracking circuit, 120 which is in turn connected to the pulse motor control circuit 90 mentioned above. The coincidence signal 110 provided from the first comparator 94 is differentiated by the differentiator 122 to provide a differential signal 124 which is an impulse signal. The auto-tracking circuit 120 receives the differential signal 124 and starts its operation in response to the signal 124. The auto-tracking circuit 120 is also connected to the reproducing amplifier 60. The amplifier 60 supplies an image reproduction signal 126, the output level of which is maximum when the recording-/reproducing head 56 is functioning as the reproducing head and the head 56 is at the optimum trace position without deviating from the relevant recording track T formed on the magnetic tape 32. The auto-tracking circuit 120 receives the image reproduction signal 126 from the amplifier 60 and causes the pulse motor control circuit 90 to control the motor 92 so that the output level of this signal 126 is maximum, i.e., that the recording/reproducing head 56 is at the optimum position. The auto-tracking circuit 120 detects deviation of the recording/reproducing head 56 from the aforementioned optimum position and generates a control signal 128 which specifies the extent of head adjustment corresponding to the deviation. The pulse motor control circuit 90 effects the drive control of the pulse motor 92 in response to the control signal 128. In this way, the position of the head 56 is adjusted by small amounts in the width direction of the track T. When the adjustment of the head position is completed, the auto-tracking circuit 120 supplies a finish signal 136 to the set terminal S of a flip-flop 138. The flip-flop 138 is set by the signal 136. When the flip-flop 138 is set, it continues to provide a signal of logic "1" to the first input terminal of each of gate circuits 140 and 142 each consisting of an AND network until it is reset by the signal 116 from the third comparator 98.

The second input terminal of the three-input gate circuit 142 is connected through an inverter 146 to the second comparator 96 mentioned above. In the present embodiment, the comparator 96, inverter 146 and gate circuit 142 constitute a switch control section 147. The output terminal of the third comparator 98 is connected to the reset terminal R of a commonly termed set-reset flip-flop 148 similar to the flip-flop 138 mentioned above. The flip-flop 148 has its set terminal S connected to the key input control circuit 74 and receives a recording operation signal 152 from the control circuit 74. The output end of the flip-flop 148 is connected to the remaining terminals of the gate circuits 140 and 142. The two-input gate circuit 140 ANDs the signals supplied from the flip-flops 138 and 148 and generates an output signal 154 corresponding to the AND. The signal 154 serves as a mode switching signal for switching the operation mode of the recording/reproducing head 56 from reproducing mode to recording mode. The mode switching circuit 62 effects the mode switching of the head in response to the signal 154. The three-input gate circuit 142 receives the output signals from the flip-flops 138 and 148 and a signal provided from the inverter 146 which inverts the output signal of the second comparator 96. If the output of the second comparator 96 is logic "0", a signal of logic "1" appears at the second input terminal of the three-input gate circuit 142. At this time, the switch circuit 66, which is connected to the erasing head 58 as mentioned earlier, is rendered conductive to render the head 58 operative for erasing operation with respect to the magnetic tape 32. On the other hand, if the output of the second comparator 96 becomes logic "1", a signal of logic "0" is coupled from the inverter 146 to the three-input gate circuit 142. As a result, the gate circuit 142 supplies an erase mode discontinue signal 156 to the switch circuit 66. In response to the signal 156, the switch circuit 66 is rendered nonconductive to cut power supply from the bias supply circuit 64 to the erasing head 58, whereby the erasing operation of the erasing head 58 is discontinued.

The operation of the embodiment of the invention having the above construction will now be described with reference to FIGS. 5 and 7A through 7C. The case of rerecording over a predetermined section, for instance from the n-th track as the start track through the (n+k)-th track as the end track, of the magnetic tape 32 of endless tape unit 30 with image data already recorded thereon is taken as an example. In this case, the number n of the start track and the number n+k of the end track for the rerecording are set in the key input control circuit 74 by the operator. First, the recording/reproducing head 56 is set to the reproducing mode by the mode switching circuit 62, and the erasing function of the erasing head 58 is released by the switch circuit 66. In this state, the heads 56 and 58 are intermittently moved in the direction of arrow 68 up to a position corresponding to the intended start track $T_n$. During this time, the track No. is determined by the track counter 88, and thereafter the heads 56 and 58 are moved stepwise one track pitch every time the magnetic tape 32 completes one cycle. When the head 56 is brought to the position corresponding to the intended start track $T_n$, the coincidence signal 110 is generated from the first comparator 94 as mentioned earlier. At this time, the reproduced output of the head 56 in the reproducing mode is being supplied to the auto-tracking circuit 120 through the amplifier 60. The auto-tracking circuit 120 thus effects positional adjustment of the head 56, which is in the side-by-side arrangement with and secured to the head 58, according to the aforementioned reproduced output such that at least the head 56 traces the start track $T_n$ in its optimum position. When the lower ends of the heads 56 and 58 are correctly aligned to the lower edge of the start track $T_n$, the auto-tracking circuit 120 generates the adjustment finish signal 136. This signal is transmitted to the flip-flop 138, thus causing the mode switching signal 154 to be supplied to the mode switching circuit 62 to switch the operating mode of the recording/reproducing head 56 from the reproducing mode to the recording mode. At the same time, the erasing head 58 is caused to start its erasing operation. This occurs because a signal of logic "1", provided from the inverter 146, is supplied to the second input terminal of the three-input gate circuit 142, thus causing the switch circuit 66 to be rendered conductive in response to the erasing mode signal from the gate circuit 142 and to connect the bias supply circuit 64 to the erasing head 58.

Figure 7A:
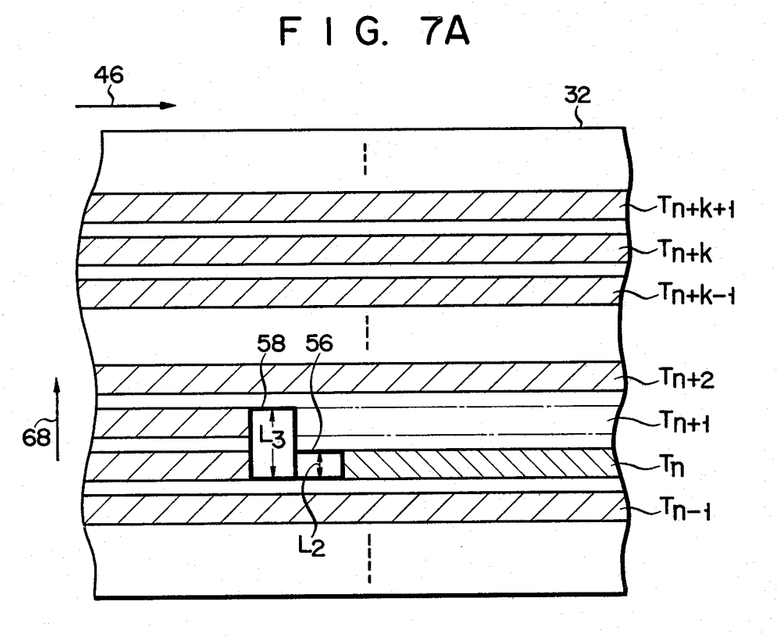
FIGS. 7A to 7C are partial views showing the positional relation between the pair of heads of FIG. 6 and the recording tracks, in sequence as the rerecording operation progress.

FIG. 7A shows a model of the recording pattern obtained after the lapse of a predetermined period of time from the start of the rerecording with the start track $T_n$. In the Figure, the tracks on which the image data has already been recorded are shown roughly shaded, and the image data newly recorded by the rerecording is shown finely shaded. The area shown by the dashed line corresponds to the tracks which have been erased by the erasing head 58. It is to be understood that the blocks showing the heads 56 and 58 here correspond to the respective head widths $L_2$ and $L_3$. This assumption simplifies the disclosure of the embodiment of the invention making it more readily understood. In the present embodiment, the erasing head 58 is adapted to simultaneously erase the two recording tracks. Thus, while the start track $T_n$ is being erased, the track $T_{n+1}$ of the next track No. is also erased by the erasing head 58. The recording/reproducing head 56, which is set in the recording mode and traces in unison with the head 58, records the new image data by the well-known method on the start track $T_n$ which has been erased by the erasing head 58. When the rerecording on the start track $T_n$ is finished with the completion of one cycle of the tape 32, the heads 56 and 58 are moved to the position corresponding to the next track $T_{n+1}$ in the manner as described above, and the sequence of operation as described is repeated.

Figure 7B:
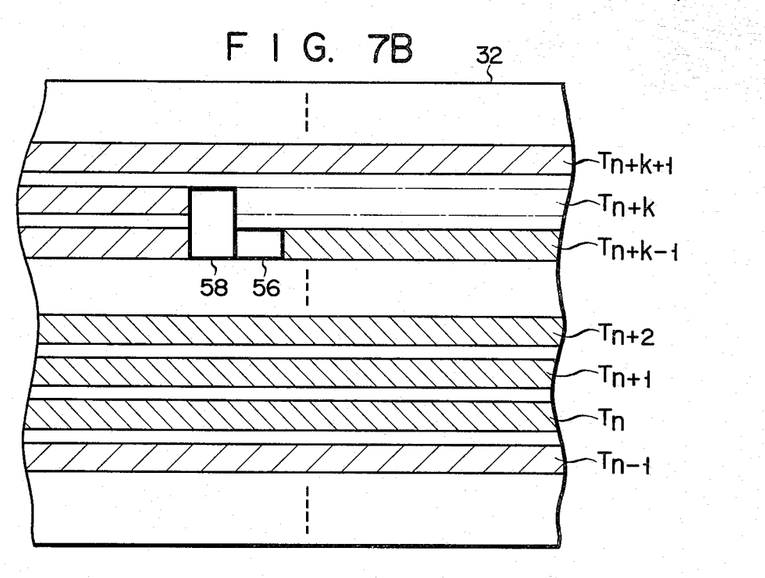

When the head 56 is brought to a position corresponding to the track $T_{n+k-1}$ which is immediately before the end track $T_{n+k}$ in the preset section during the progress of the rerecording, the erasing head 58 also erases the end track $T_{n+k}$ as shown in FIG. 7B. In other words, the erasure of the end track $T_{n+k}$ is effected concurrently with the progress of the rerecording on the track $T_{n+k-1}$. Thus, by the time when the head 56 is moved to the position corresponding to the end track $T_{n+k}$, the old data on the end track $T_{n+k}$ has already been erased.

Figure 7C:
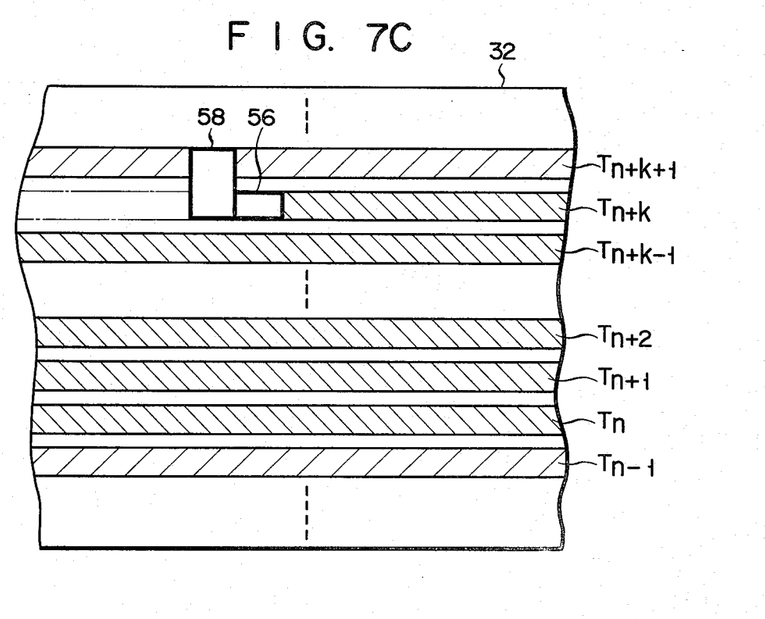

When the recording head 58 is brought to a position corresponding to the end track $T_{n+k}$, the coincidence signal 112 as mentioned above is generated from the second comparator 96 (FIG. 5). At the same time, the adding circuit 114 sets the track No. n+k+1 next to the end track No. by adding 1 to the end track No. n+k. This value is supplied to the third comparator 98. The signal 112 from the second comparator 96 is inverted through the inverter 146 into a logic "0" signal which is supplied to the three-input gate circuit 142. Thus, at this instant, i.e., at the instant when the recording head 58 is brought to a position corresponding to the end track $T_{n+k}$, the gate circuit 142 provides the erase mode termination signal 156. This signal 156 is supplied to the switch circuit 66 connected to the erasing head 58 to render the switch circuit 66 nonconductive, whereby the erasing function of the erasing head 58 is released. That is, even though the erasing head 58 covers the next track $T_{n+k+1}$ on which the rerecording is not to be made, erroneous erasure of the next track $T_{n+k+1}$ is prevented since the erasing function is lost in the manner as described above. Thus, in this state only the recording of the new image data on the end track $T_{n+k}$ which has already been erased is made by the recording head 56 as shown in FIG. 7C. When the rerecording on the end track $T_{n+k}$ is completed in this way, the heads 56 and 58 are moved to the position corresponding to the next track $T_{n+k+1}$. At this instant, the third comparator 98 shown in FIG. 5 generates the coincidence signal 116. This signal 116 is supplied to the flip-flops 138 and 148, whereby the mode switching signal 154 from the two-input gate circuit 140 is discontinued. Thus, the operation mode of the mode switching circuit 62 is switched again to the reproducing mode, and the recording operation of the recording/reproducing head 56 is released. In this way, the rerecording is completed.

As has been described in the foregoing, with the stationary head type VTR in one embodiment of the invention, the head width $L_3$ of the erasing head 58 which is in the side-by-side arrangement with the recording/reproducing head 56 is set such that it covers two recording tracks. Thus, even if the position of the heads 56 and 58 deviates in the direction opposite to the direction of movement of the heads while the rerecording is being made on, for instance, the track $T_n$ due to errors involved among the individual units, it is possible to reliably prevent the generation of an insufficient erasure region in the track $T_n$ where part of the unnecessary data remains stored. Also, even in the event that an insufficient erasure region is generated on the track $T_{n+1}$ at this time, it can be completely erased by the erasing head 58 before the recording of the new data by the rerecording when the heads are brought to the position corresponding to the track $T_{n+1}$. The sequence of operation described above is repeated with the progress of the rerecording, and the new data can be recorded in the preselected section from the track $T_n$ to the end track $T_{n+k}$ without the possibility of leaving any undesired insufficient erasure region. With unnecessary data thus all erased, it is possible to eliminate the noise component that might otherwise be introduced into the new data, and thus effect recording of data while rerecording, by maintaining a high signal-to-noise ratio.

Further, with the above embodiment the auto-tracking circuit 120 undertakes fine adjustment of the position of trace on the start track $T_n$ by the head 56. Thus, when effecting the rerecording on the start track $T_n$, the possibility of undesired erasure (excessive erasure) of a part of the immediately preceding track $T_{n-1}$, on which the rerecording is not to be made, due to deviation of the heads toward the track $T_{n-1}$, can be reliably eliminated. Thus, the image data that is to remain stored can be reliably protected against erroneous excessive erasure. In summary, it is possible to reliably prevent the defective operation of excessive erasure and insufficient erasure at the time of the rerecording and obtain the rerecording of new data while maintaining high quality. Thus, high quality image reproduction free from disturbance due to noise can be obtained.

Although the present invention has been shown and described with respect to a particular embodiment, nevertheless, various changes and modifications which are obvious to a person skilled in the art to which the invention pertains are deemed to lie within the spirit, scope, and contemplation of the invention.

For example, while in the above embodiment the erasing width $L_3$ of the erasing head 58 is set such as to simultaneously erase two recording tracks, this is by no means limitative; for instance it may be set such as to simultaneously erase three or more tracks. In this case, a subtracting circuit may be newly provided between the end track counter 106 and second comparator 96 in order to prevent excessive erasure of tracks following the end track $T_{n+k}$ of the rerecording. More particularly, it may be arranged such that the subtracting circuit subtracts from the value $T_{n+k}$ of the end track No. a value that is determined according to the erasing width mentioned above to set a track No. which is before the end track No. $T_{n+k}$ and at which the erasing operation of the erasing head 58 is stopped and a signal corresponding to this value is supplied to the second comparator 96.

Further, while the above embodiment has concerned with a so-called two-head system in which the recording and reproduction are effected by a single head 56 other than the erasing head 58, this is by no means limitative, and a construction where the recording and reproduction are effected by respective independent heads is of course contemplated.

What we claim is:

1. A magnetic recording system for effecting rerecording over a specified track section including a start track and an end track selected from a plurality of recording tracks which are formed on a magnetic recording medium to extend in a first direction corresponding to a predetermined running direction of the magnetic recording medium and have an equal track width and in which data is stored, said magnetic recording system comprising:
   (a) first head means for effecting recording and reproduction of data with respect to a single recording track on said magnetic recording medium;
   (b) second head means, disposed in side by side relation with respect to said first head means in the first direction of said recording tracks on said magnetic recording medium and secured to said first head means, for simultaneously erasing the data stored in a predetermined number of recording tracks among the recording tracks contained in said specified track section of the rerecording, said predetermined number of recording tracks including at least a recording track traced by said first head means and the next recording track;

(c) head position adjusting means for detecting a deviation of the position of said first head means with respect to said start track and compensating for the deviation of position by moving said first and second head means in a second direction according to the detected extent of deviation; and (d) control means, connected to said second head means, for causing the erasing operation of said second head means to be started when said first head means is brought to a position corresponding to said start track in the rerecording mode and for stopping said erasing operation of said second head means after the data stored in said end track has been erased by said second head means.

2. The magnetic recording system according to claim 1, wherein said first head means has an operating width corresponding to the track width of one recording track on said magnetic recording medium and said second head means has an erasing width set to cover a predetermined number of, at least two, recording tracks formed on said magnetic recording medium.

3. The magnetic recording system according to claim 2, wherein said magnetic recording medium is formed of a magnetic tape included in an endless tape unit.

4. The magnetic recording system according to claim 1, wherein said first and second head means, during rerecording, are intermittently moved in said second direction substantially perpendicular to said first direction to sequentially trace recording tracks contained in said specified track section of said tape, said first head means has one end of said operating width, and said second head means has one end of said erasing width, said ends being substantially aligned along a line in a direction opposite to said second direction.

5. The magnetic recording system according to claim 1, wherein said head position adjusting means includes:
motor means for moving said first and second head means in said second direction; and
tracking means, connected to said first head means and said motor means, for detecting a reproduced output of said first head means and for controlling said motor means such that said reproduced output is substantially maximized.

6. The magnetic recording system according to claim 5, wherein said tracking means generates a predetermined electrical signal after said reproduced output is maximized, said first head means being switched to a recording mode in response to said signal.

7. The magnetic recording system according to claim 1, wherein the data stored in said end track is erased by said second head means before said first head means is brought to a position corresponding to the end track.

8. The magnetic recording system according to claim 1, wherein said control means includes:
bias supply means, connected to said second head means, for supplying predetermined bias current to said second head means;
switch means, provided between said second head means and said bias supply means, for performing a switching operation to selectively supply the bias current from said bias supply means to said second head means; and
switching operation control means, connected to said switch means, for controlling the switching operation of said switch means according to the specified track section of the rerecording and the number of recording tracks to be simultaneously erased by said second head means.

* * * * *